(12) United States Patent
Ramirez (10) Patent No.: US 7,896,113 B1
(45) Date of Patent: Mar. 1, 2011

(54) POLICE ROBOTIC SYSTEM (76) Inventor: Fernando Ramirez, Redlands, CA (US)

( * ) Notice: Subject to any disclaimer, the term of this patent is extended or adjusted under 35 U.S.C. 154(b) by 359 days.

(21) Appl. No.: 12/119,140

(22) Filed: May 12, 2008

Related U.S. Application Data (60) Provisional application No. 60/930,155, filed on May 12, 2007.

(51) Int. Cl.
B62D 55/00 (2006.01)

(52) U.S. Cl. .............. 180/9; 180/9.3; 180/9.5; 180/9.64

(58) Field of Classification Search ............. 180/9, 180/9.5, 9.64, 9.23, 9.28, 9.3, 9.46, 6.7
See application file for complete search history.

(56) References Cited

U.S. PATENT DOCUMENTS

| | | | |
|---|---|---|---|
| 3,207,396 A * | 9/1965 | Mundell et al. ............. 224/513 |
| 3,872,983 A | 3/1975 | Chapman | |
| 3,896,741 A | 7/1975 | Chapman | |
| 4,268,209 A | 5/1981 | Westerman | |
| 4,483,407 A | 11/1984 | Iwamoto et al. | |
| 4,636,137 A | 1/1987 | Lemelson | |
| 4,709,265 A | 11/1987 | Silverman et al. | |
| 4,740,187 A * | 4/1988 | Rasmussen et al. ........... 446/73 |
| 4,932,831 A | 6/1990 | White et al. | |
| 5,018,651 A | 5/1991 | Hull et al. | |
| 5,022,812 A | 6/1991 | Coughlan et al. | |
| 5,119,732 A * | 6/1992 | Lisy ............................ 104/48 |
| 5,199,842 A | 4/1993 | Watt et al. | |
| 5,395,020 A | 3/1995 | King | |
| 5,435,405 A | 7/1995 | Schempf et al. | |
| 5,465,525 A | 11/1995 | Mifune et al. | |
| 5,536,130 A | 7/1996 | Edensor | |
| 5,570,992 A | 11/1996 | Lemelson | |
| 5,680,976 A | 10/1997 | Koliopoulos et al. | |
| 5,938,395 A * | 8/1999 | Dumont, Jr. ................ 414/462 |
| 6,238,265 B1 * | 5/2001 | Crane et al. ................. 446/456 |
| 6,263,989 B1 | 7/2001 | Won | |
| 6,431,296 B1 | 8/2002 | Won | |
| 6,659,491 B2 * | 12/2003 | Green ..................... 280/423.1 |
| 6,783,315 B1 | 8/2004 | Senechal | |
| 6,884,018 B1 | 4/2005 | Dugan et al. | |
| 6,948,732 B2 * | 9/2005 | Amacker ................. 280/415.1 |
| 7,011,171 B1 | 3/2006 | Poulter | |
| 7,014,102 B2 * | 3/2006 | Oohashi ..................... 235/375 |
| 7,083,373 B1 * | 8/2006 | Boudreau ................... 414/462 |
| 7,348,747 B1 * | 3/2008 | Theobold et al. ........ 318/568.21 |
| 7,380,627 B2 * | 6/2008 | Huang et al. ................ 180/167 |
| 7,404,505 B2 * | 7/2008 | Walther ...................... 224/566 |

(Continued)

Primary Examiner—Paul N Dickson
Assistant Examiner—Tashiana Adams
(74) Attorney, Agent, or Firm—Eric Karich (57) ABSTRACT A robotic system adapted to deploy from a police vehicle for inspecting a suspect vehicle has a robot unit and a carrier unit. The robot unit includes a robot base having a drive system responsive to a control unit having a robot transceiver, and a camera operably mounted on robot unit for inspecting the suspect vehicle. A primary display adapted to be operably positioned within the police vehicle functions for displaying the images from the camera. A remote control unit, also adapted to be operably positioned within the police vehicle, enables the user to operably control the control unit of the robot unit. The carrier unit includes a carrier housing that pivots between a raised position for carrying the robot unit, and a lowered position for deploying the robot unit.

3 Claims, 4 Drawing Sheets

U.S. PATENT DOCUMENTS

| | | | |
|---|---|---|---|
| 7,527,282 B2 * | 5/2009 | Gilbert | 280/491.3 |
| 7,597,162 B2 * | 10/2009 | Won | 180/9.32 |
| 7,600,593 B2 * | 10/2009 | Filippov et al. | 180/9.1 |
| 7,654,348 B2 * | 2/2010 | Ohm et al. | 180/9.32 |
| 2004/0197014 A1 * | 10/2004 | Oohashi | 382/118 |
| 2008/0206030 A1 * | 8/2008 | Reuille et al. | 414/462 |
| 2009/0226292 A1 * | 9/2009 | Habisreitinger | 414/728 |

\* cited by examiner

POLICE ROBOTIC SYSTEM

CROSS-REFERENCE TO RELATED APPLICATIONS

This application for a utility patent claims the benefit of U.S. Provisional Application No. 60/930,155, filed May 12, 2007.

STATEMENT REGARDING FEDERALLY SPONSORED RESEARCH

Not Applicable

BACKGROUND OF THE INVENTION

1. Field of the Invention

This invention relates generally to robotic systems, and more particularly to a robotic system that includes a carrier unit and a robot unit that together enable police or military personnel to quickly inspect a suspect vehicle safely from a remote location while maintaining mobility and with a minimum of manpower.

2. Description of Related Art

The prior art includes a variety of carrier devices mounted on a vehicle for carrying another vehicle. The following art defines the present state of this field:

Westerman, U.S. Pat. No. 4,268,209, teaches a storage container mounted on a motor home for carrying a vehicle. The storage container is hingeably attached to a motor home and has hydraulic cylinders for swinging the storage container from a first horizontal loading position to a second vertical storage position. The container is designed to receive a specially designed collapsible vehicle and has means to attach the vehicle to the floor of the container when in a horizontal loading position, and for latching the container with the collapsed vehicle therein to the rear of the motor home in its vertical storage position.

Hull et al., U.S. Pat. No. 5,018,651, teaches a load carrying apparatus that attaches to the existing square tube trailer hitch or receiver of a vehicle. The apparatus is adapted to tilt to the side for loading an unloading the apparatus.

Edensor, U.S. Pat. No. 5,536,130, teaches a storage container adapted to facilitate carrying wheelchairs on an automobile. The storage container includes an articulated mounting to enable it to be mounted to the rear of an automobile such that the container is movable between a raised position providing ground clearance for forward travel of the automobile, and a lowered position proximate to the ground to facilitate loading and unloading. Various other patents teach similar wheelchair carrying devices mounted on the rear of an automobile, including Similar carriers that are adapted to be attached to a trailer hitch include the following: Watt et al., U.S. Pat. No. 5,199,842, which teaches a wheelchair carrier attaches to the back of a vehicle for transporting a wheelchair, and includes a ramp that folding to the side for loading the wheelchair; and King, U.S. Pat. No. 5,395,020, which teaches a similar carrier that is cantilevered from the trailer hitch for carrying a scooter. See also Boudreau, U.S. Pat. No. 7,083,373, Koliopoulos et al., U.S. Pat. No. 5,680,976, Senechal, U.S. Pat. No. 6,783,315, and Dugan et al., U.S. Pat. No. 6,884,018.

Chapman, U.S. Pat. Nos. 3,896,741 and 3,872,983, teach a freight carrying railway car for carrying a vehicle. The railway car includes a plurality of doors mounted for pivotal movement about a horizontally disposed axis from an open, loading position to a closed, cargo carrying position. In the open position, the doors serve as ramps onto which the motor vehicle may be driven. As the doors are pivoted to their closed position the motor vehicle becomes suspended upon the doors. A locking arrangement is provided at the top and side of the doors for insuring that they are locked. Two different types of hold-downs are disclosed for holding the motor vehicles in position upon the closed doors.

None of these references teach a carrier unit that is mounted on the front of an automobile and constructed for easily driving a robot unit onto and off of the carrier unit by remote control.

The prior art also teaches a variety of robot units. Examples of prior art robot systems include the following:

Lemelson, U.S. Pat. Nos. 5,570,992 and 4,636,137, teach a self-propelled robot having an upstanding support mounted on a tracked carriage, and a manipulation arm assembly supported for movement on the upstanding support. The manipulation arm assembly includes an automatic, controlled manipulator that includes a moveable tool head on an arm and a tool supported at the end of the arm. The manipulator may be moveable in multiple or all directions. A storage for remotely generated control signals can be accessed to control motors causing 3D motion of the tool head, attachment of the tool, and (if applicable) motion of the manipulator, and also to control power to operate the tool. Video signals generated at the manipulator are used to identify the workpiece, to select one of a plurality of stored control programs, and to select the tool operations applied. A wireless signal transmitter and wireless receiver circuitry operate with short wave command control signals to effectuate remote control of the manipulation apparatus.

Mifune et al., U.S. Pat. No. 5,465,525, teaches a robot system for exterminating termites under the floor of an architectural structure. The robot system includes an onboard computer which is electrically connected through radio communication with a host computer located outside the robot. The robot includes a main body tracks located on the opposite sides of the main body. The tracks are driven by driving motors mounted on the robot and can be independently operated. The robot includes a mechanism for controlling the vertical positions of various sections of the main body relative to the tracks. A nozzle mechanism for spraying chemical or insecticide and a CCD camera are mounted on the main body. The onboard computer and host computer are operatively associated with each other to control the driving motors, the vertical position controlling mechanism, the nozzle mechanism and the CCD camera.

Iwamoto et al., U.S. Pat. No. 4,483,407, teaches a vehicle that includes a pair of tracks each extending around a series of wheels arranged in a plane adjacent to one side of the vehicle body. One of the series of wheels on each side of the vehicle body is movable relative to the vehicle body to a selected position to vary the configuration of the endless track in side view so that the vehicle is given a superior running performance and is freely movable along paths having various obstacles. The vehicle includes a camera mounted upon an extension arm for inspecting various points. Similar robot vehicles having cameras are described in Coughlan et al., U.S. Pat. No. 5,022,812, and White et al., U.S. Pat. No. 4,932,831.

There are also various surveillance systems that enable persons (such a military personnel) to investigate potentially hazardous locations. Silverman et al., U.S. Pat. No. 4,709,265, for example, teaches a surveillance system having a radio remote controlled vehicle that is sized and shaped for optimum maneuverability and stability, including mobility on stairs and inclined surfaces. The vehicle is designed to have a low center of gravity that is shiftable up and down, front to rear and side to side under operator control in order to provide stability. The top deck of the vehicle is uniquely shaped and is adapted to support any of several payloads, including an articulated arm module that is moveable in a pan and tilt direction and a smear sampler mechanism for repeatedly taking surface samples. The vehicle is moved by independently operated, motor driven tracks located on each of the two longitudinal sides of the vehicle and is adapted to move in a forward, reverse and rotational directions. Remote monitoring is provided by stereoptic TV cameras, stereo sound, and variety of environmental sensors.

Poulter, U.S. Pat. No. 7,011,171, also teaches a rugged terrain robot adapted to function as a reconnaissance robot to optimize safety of search or rescue personnel. Remote control places the RTR in either a rolling mode or in a stair-climbing mode. Remote feedback is provided by an on-board RTR camera and microphone. The RTR consists of two clamshell sections and a tail boom section. The RTR uses polymorphic locomotion of the clamshells for efficient maneuverability in traversing rugged terrain when in a "rolling" mode and is switched remotely into a stair-climbing mode (or extreme terrain) using end-over-end clamshell motion with a tail boom assist to climb stairways. The RTR can carry various communication devices, sensors and payloads for use by police, firemen, soldiers, rescue or other applications to optimize safety when direct entry by a human may not desirable until an area is reconnoitered.

Won, U.S. Pat. Nos. 6,263,989 and 6,431,296, teach an articulated tracked vehicle that has a main section, which includes a main frame, and a forward section. The main frame has two sides and a front end, and includes a pair of parallel main tracks. Each main track includes a flexible continuous belt coupled to a corresponding side of the main frame. The forward section includes an elongated arm. One end of the arm is pivotally coupled to the main frame near the forward end of the main frame about a transverse axis that is generally perpendicular to the sides of the main frame. The arm has a length sufficiently long to allow the forward section to extend below the main section in at least some degrees of rotation of the arm, and a length shorter than the length of the main section. The center of mass of the main section is located forward of the rearmost point reached by the end of the arm in its pivoting about the transverse axis. The main section is contained within the volume defined by the main tracks and is symmetrical about a horizontal plane, thereby allowing inverted operation of the robot. See also Schempf et al., U.S. Pat. No. 5,435,405.

The prior art robot systems are useful for various tasks, but are generally very difficult to move due to their size and weight. In operation, they are typically carried in a vehicle, and then manually lifted to the ground by a team of two or more users. The vehicle must them be lifted back into the vehicle by the team when the robot's work is completed. This severely restricts the mobility of the robot system, and requires a team of users to operate the system. All of the above-described references are hereby incorporated by reference in full.

The prior art teaches carriers for wheeled vehicles, and the prior art teaches robotic systems for performing various tasks. However, the prior art does not teach a robotic system that includes a carrier unit and a robot unit that together enable police or military personnel to quickly inspect a suspect vehicle safely from a remote location while maintaining mobility and with a minimum of manpower, even a single user. The present invention fulfills these needs and provides further related advantages as described in the following summary.

SUMMARY OF THE INVENTION

The present invention teaches certain benefits in construction and use which give rise to the objectives described below.

The present invention provides a robotic system adapted to deploy from a police vehicle for inspecting a suspect vehicle. The robotic system includes a robot unit and a carrier unit. The robot unit includes a robot base having a drive system responsive to a control unit having a robot transceiver, and a camera operably mounted on robot unit for inspecting the suspect vehicle. A primary display adapted to be operably positioned within the police vehicle functions for displaying the images from the camera. A remote control unit, also adapted to be operably positioned within the police vehicle, enables the user to operably control the control unit of the robot unit. The carrier unit includes a mounting base that is adapted to be mounted on the police vehicle; a carrier housing having a floor element sized and shaped to receive the robot unit thereupon, the floor element having a top surface and a forward edge; a pair of pivots that pivotally mount the carrier housing onto the mounting base such that the carrier housing can pivot between a raised position wherein the top surface is generally vertical, and a lowered position wherein the top surface is generally horizontal and wherein the forward edge is adjacent the street so that the robot unit can be driven onto the top surface; and a locking element for locking the robot unit onto the top surface.

A primary objective of the present invention is to provide a robotic system having advantages not taught by the prior art.

Another objective is to provide a robotic system that includes a carrier unit and a robot unit that together enable police and/or military personnel to quickly and easily inspect a suspect vehicle safely from a safe location.

Another objective is to provide a robotic system that enables a single user to quickly and easily mount the robot unit on the carrier unit of the police vehicle, to maintain rapid mobility.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

The above-described drawing figures illustrate the invention, a robotic system 10 adapted to deploy from a police vehicle 12 onto a street 13 for inspecting an interior 14 of a suspect vehicle 16. The robotic system 10 may be used, for example, to assist a police officer who has pulled over the suspect vehicle 16 for some form of traffic violation, so that the "first look" into the suspect vehicle 16 can be made without exposing the officer to potential danger.

The term "police" is hereby defined to include any form of military, militia, private security agency, and/or other authority that may need to inspect a "suspect vehicle," which is hereby defined to include any form of vehicle, container, device, suspected bomb, or other item or location that may need to be inspected and yet may pose a danger to the inspecting personnel. The term "police vehicle" is hereby defined to include a police cruiser, as well as any other form of police SUV, Hummer, truck, military vehicle, or any other form of vehicle that may be suited for carrying out the assigned mission.

Figure 1:
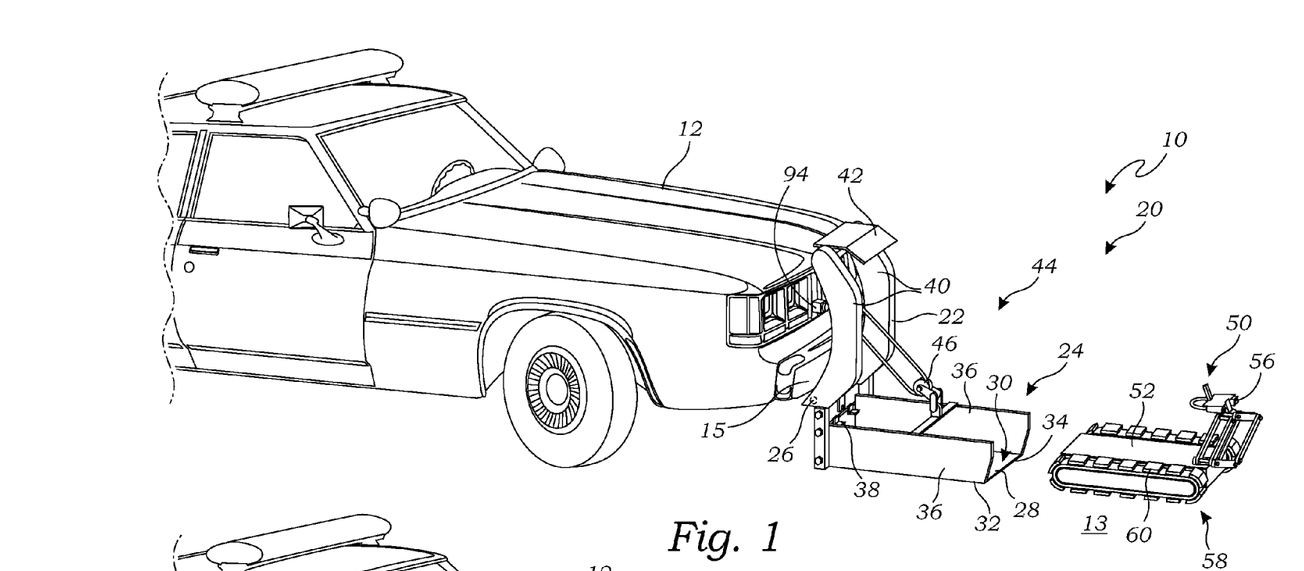
FIG. 1 is a perspective view of a robotic system according to one embodiment of the present invention, illustrating a robot unit positioned on a street in front of a carrier unit mounted on a police vehicle, a floor element of the carrier unit being positioned in an lowered position for deploying the robot unit.

FIG. 1 is a perspective view of the robotic system 10 according to one embodiment of the present invention. As shown in FIG. 1, the robotic system 10 includes a robot unit 50, a carrier unit 20 for carrying and deploying the robot unit 50, and various control units and camera systems for controlling the robot unit 50 and for inspecting the suspect vehicle 16. FIG. 1 illustrates the robot unit 50 positioned on the street 13 in front of the carrier unit 20, with a floor element 28 of the carrier unit 20 being positioned in a lowered position for deploying the robot unit 50.

Figure 2:
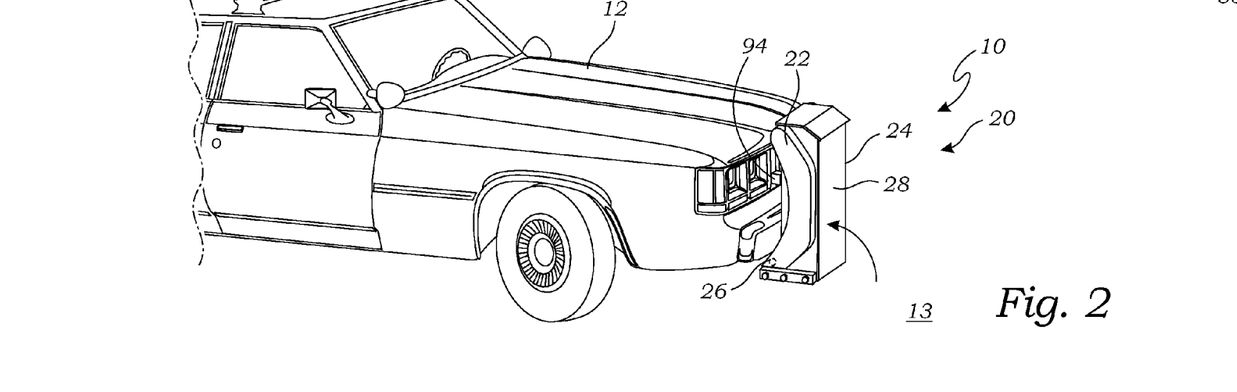
FIG. 2 is a perspective view of a robotic system once the robot unit has been positioned on the floor element within the carrier unit, and wherein the floor element of the carrier unit has been moved to a raised position wherein the floor element is generally vertical and the robot unit is stored within the carrier unit.

FIG. 2 is a perspective view of a robotic system 10 once the robot unit 50 has been positioned on the floor element 28 within the carrier unit 20, and wherein the floor element 28 of the carrier unit 20 has been moved to a raised position wherein the floor element 28 is generally vertical and the robot unit 50 is stored within the carrier unit 20.

As illustrated in FIGS. 1 and 2, the carrier unit 20 includes a mounting base that is adapted to be mounted on a front 15 of the police vehicle 12, a carrier housing 22 for receiving and storing the robot unit 50, and a pair of pivots 26 that pivotally mount the carrier housing 22 onto the mounting base. The pair of pivots 26 enable the floor element 28 to move between the lowered position (shown in FIG. 1), and the raised position (shown in FIG. 2). The floor element 28 may be a generally planar sheet having a generally planar top surface 30, side edges 32, and a forward edge 34, the floor element 28 being sized and shaped to receive the robot unit 50 thereupon. The side edges 32 may include upwardly extending sidewalls 36 that help hold the robot unit 50 in its proper position and protect the robot unit 50 from damage. A front sidewall 38, orthogonal to the upwardly extending sidewalls 36, performs a similar function.

In one embodiment, the carrier housing 22 pivots forward so that the forward edge 34 extends ahead of the police vehicle 12 and contacts the surface 13 when fully pivoted to the lowered position, thereby facilitating the robot unit 50 being driven onto and off of the floor element 28.

In alternative embodiments, the carrier unit 20 may be mounted on the police vehicle using an alternative mounting technique, such as techniques described in the prior art listed above, and incorporated herein by reference.

In the embodiment of FIGS. 1 and 2, the mounting base may be fixedly mounted to the police vehicle 12, such as to the frame (not shown), with bolts, welding or other suitable method known to those skilled in the art. The mounting base may be removably mounted so that the carrier unit 20 may be readily removed for maintenance. The mounting base may include side elements 40 that interlock with the upwardly extending sidewalls 36 of the floor element 28 to securely hold the robot unit 50. The mounting base may also include a canopy element 42 that extends over the floor element 28 to protect the robot unit 50 from the elements when the robot unit 50 is stored in the carrier unit 20.

The pair of pivots 26 pivotally mount the carrier housing 22 onto the mounting base such that the carrier housing 22 can pivot between the raised position and the lowered position, as described above. The carrier unit 20 may further includes a locking element 44 for locking the robot unit 50 onto the floor element 28. The locking element 44 may be provided by the front sidewall 38 and the upwardly extending sidewalls 36, as in the present embodiment, or by any form of locking lever or hood (not shown), a magnetic locking element (not shown), a manual clip system (not shown), or any other form of engagement system that protects the robot unit 50 from accidentally falling from the carrier unit 20.

As shown in FIG. 1, the carrier unit 20 also includes a docking actuator 46 for lifting the floor element 28 from the lowered to the raised position. In the present embodiment, the docking actuator 46 is a pulley system driven by a winch (not shown) or other form of actuator. In alternative embodiments, the docking actuator could also be an electronic motor or other form of actuator, or any other mechanism known to those skilled in the art.

Also as shown in FIG. 1, the carrier unit 20 further includes a switch 48 for registering when the robot unit 50 is properly positioned completely on the carrier unit 20, and a pair of electrical contacts for recharging the robot unit 50, as described in greater detail below.

Figures 3, 4, 5:
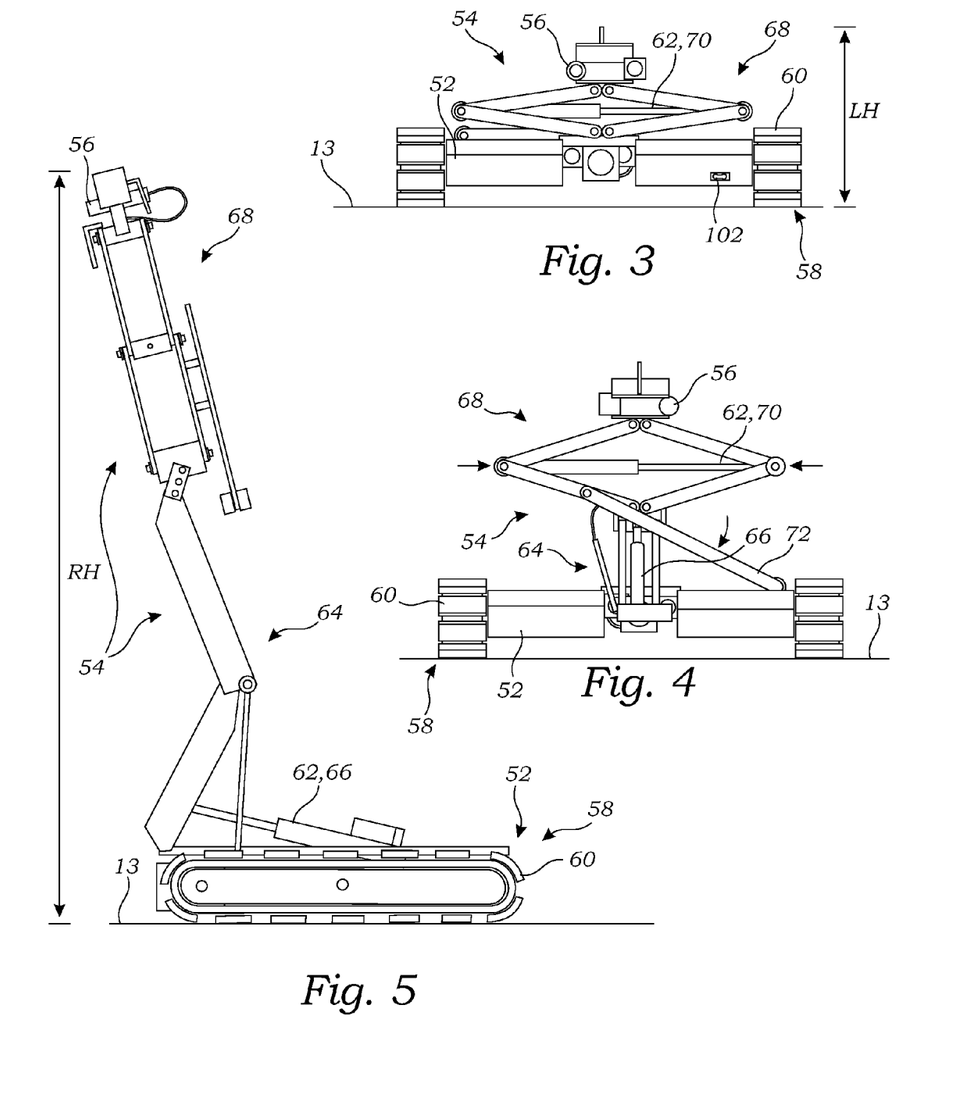
FIG. 3 is a front elevation view of the robot unit, illustrating the extendable arm and the camera is a stored position.
FIG. 4 is a front elevation view of the robot unit, illustrating the extendable arm being used to raise the camera from the stored position to an intermediate position in which the camera is at least partially raised from the robot base.
FIG. 5 is a side elevation view of the robot unit, illustrating the extendable arm and camera is an extended position.
Figure 6:
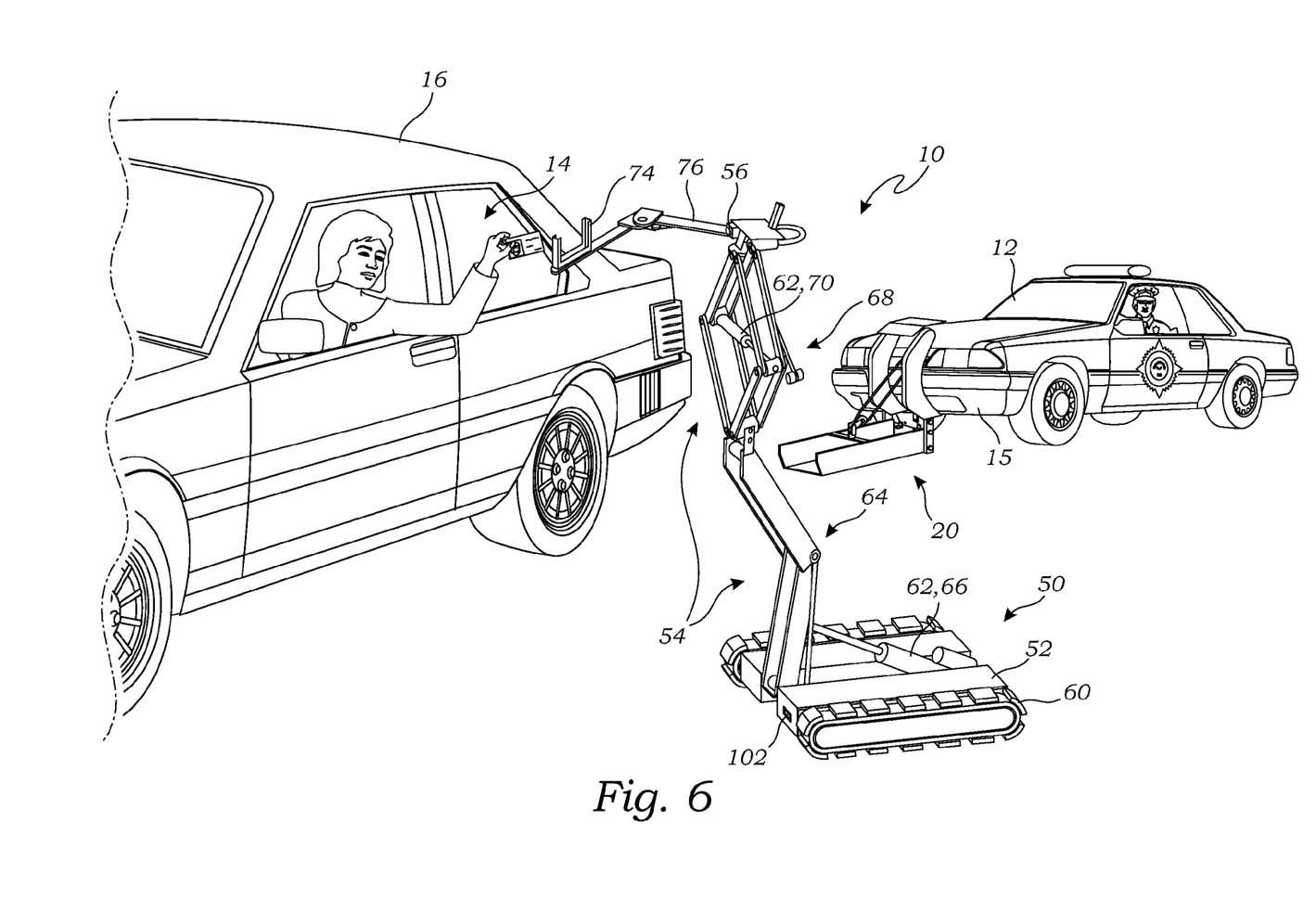
FIG. 6 is a perspective view of the robot unit, illustrating the extendable arm and the camera in the extended position, as the robot unit is used to inspect a suspect vehicle.

FIG. 3 is a front elevation view of the robot unit 50, illustrating an extendable arm 54 holding a camera 56 is a stored position. FIG. 4 is a front elevation view of the robot unit 50, illustrating the extendable arm 54 being used to raise the camera 56 from the stored position to an intermediate position in which the camera 56 is at least partially raised from a robot base 52. FIG. 5 is a side elevation view of the robot unit 50, illustrating the extendable arm 54 and the camera 56 is an extended position. FIG. 6 is a perspective view of the robot unit 50, illustrating the extendable arm 54 and the camera 56 in the extended position, as the robot unit 50 is used to inspect a suspect vehicle 16.

As illustrated in FIGS. 3-6, the robot base 52 has a drive system 58 for driving the robot unit 50 about its environment. In one embodiment, the drive system 58 includes a pair of track elements 60 for driving the robot unit 50, and a motor 78 (illustrated in FIG. 7 and discussed in greater detail below). In the embodiments of FIGS. 3-6, the track elements 60 may be caterpillar treads that enables the robot unit 50 to move over difficult terrain. The term "drive system" should be broadly construed, however, and in alternative embodiments the drive system 58 may include any form of wheels, legs, or other form of movement that may be adapted by those skilled in the art.

The camera 56 is operably mounted on the extendable arm 54, as described above, for capturing images of the suspect vehicle 16. In one embodiment, the camera 56 is a digital camera capable of capturing high quality video to enable the police user to clearly see into a suspect vehicle 16. However, the term "camera" is hereby defined to include any form of camera or image capture technology known to those skilled in the art.

An arm actuator 62 functions to control the extendable arm 54, for raising the camera 56 from the lowered position adjacent the robot base 52, to the raised position in which the camera 56 is raised above the robot base 52 to a raised height RH for inspecting the interior 14 of the suspect vehicle 16 (shown in FIG. 6).

In one embodiment, the extendable arm 54 includes two parts, a lower lever lift 64 driven by an actuator 66 such as an electric actuator, and an upper scissor jack 68 driven by a second actuator 70 such as a screw drive. As shown in FIG. 3, the lower lever lift 64 is initially completely collapsed within the robot base 52, and the upper scissor jack 68 is lowered so that the camera 56 is lowered to nearly adjacent the robot base 52.

As shown in FIG. 4, when the camera 56 is to be raised, the upper scissor jack 68 is the first to begin lifting the camera 56. The lower lever lift 64 is not able to lift at this point, because it is completely flat and unable to gain the leverage necessary. The upper scissor jack 68 may include an assist lever 72 that extends outwardly from the upper scissor jack 68 so that when the scissor jack 68 begins to raise the camera 56, and the assist lever functions to raise the lower lever lift 64 enough so that the lower lever lift 64 is able to begin lifting itself. This construction enables the camera 56 to be raised to the raised height RH that is great (approximately 4-6 feet, more preferably around 5 feet) in comparison to a very small lowered height LH (of perhaps 1 foot or less) when in the lowered position.

While the described structure represents one embodiment, alternative arms and actuators are also possible and should be considered within the scope of the present invention.

As shown in FIG. 6, when the camera 56 is lifting all the way to the raised position, the camera 56 is able to inspect the suspect vehicle 16. The camera 56 is able to look through the windows of the suspect vehicle 16, even if the suspect vehicle 16 might be an SUV or otherwise large vehicle, and view the floor of the suspect vehicle 16 to look for weapons, drugs, etc.

As shown in FIG. 6, the robotic system 10 may include an identification holder 74 mounted on an extension arm 76 that positions the identification holder 74 within the viewing scope of the camera 56. The driver of the suspect vehicle 16 is then able to insert his or her identification card or papers in the identification holder 74 for inspection by the police officer via the camera 56. If the driver of the suspect vehicle 16 has warrants out for his or her arrest, or if weapons or drugs are observed in the suspect vehicle 16, the police officer can call for backup and take extra precautions before approaching the suspect vehicle 16. If the initial inspection does not turn up anything of concern, the police officer would have the option of approaching the suspect vehicle 16 in person to discuss any minor traffic violations, non-functional lighting, or other matters.

Figure 7:
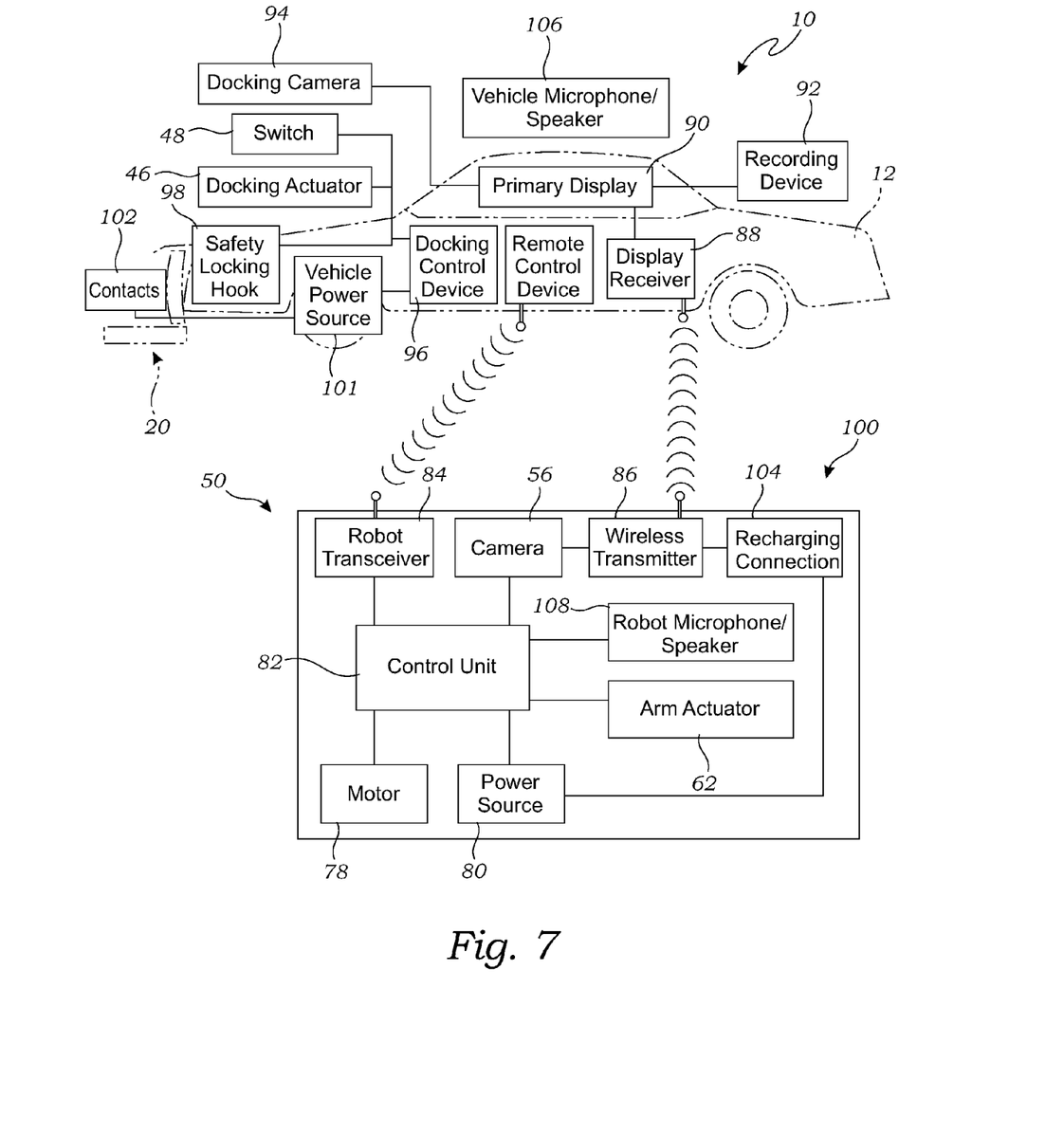
FIG. 7 is a block diagram of the robotic system.

FIG. 7 is a block diagram of the robotic system 10, illustrating various internal components of the system, and elements of the system positioned within the police vehicle 12. As illustrated in FIG. 7, the track elements 60 are driven by a motor 78 responsive to a control unit 82 having a robot transceiver 84. The motor 78 (or motors) are standard motors used in similar applications, and may include motor controllers and related equipment (not shown). Since the motor 78 and related drive components are well known in the art, they are not described in greater detail herein. Likewise, the specific construction of the control unit 82 for operably controlling the pair of track elements 60, the arm actuator 62, and the camera 56, is well known in the art, and is therefore not described in greater detail herein.

The robot transceiver 84 is adapted to operably communicate with a remote control device so that the police officer in the police vehicle 12 is able to operably control the robot unit 50. The remote control device enables the police officer to drive the robot unit 50, to control the various actuators of the extendable arm 54 and the camera 56.

The camera 56 may be operably connected with the control unit 82, and includes a wireless transmitter 86 for transmitting images from the camera 56 to a display receiver 88 of the police vehicle 12 for viewing on a primary display 90, such as an LCD screen or similar device. The primary display 90 is operably positioned within the police vehicle 12 so that the police officer is able to easily view the primary display 90. The primary display 90 may also be operably connected to a recording device 92 for recording the images received from the camera 56.

The primary display 90, or a secondary display (not shown), may also by operably connected to a docking camera 94 operably positioned adjacent the carrier unit 20, such as on the police vehicle 12 or the carrier unit 20, for viewing the robot unit 50 as it is driven onto the carrier unit 20. The docking camera 94 captures images of the robot unit 50 as it approaches and enters the carrier unit 20, thereby enabling the police officer to driving the robot unit 50 onto the carrier unit 20, regardless of where the officer is located (such as inside the police vehicle 12). This enables a single user to both operate the robot unit 50, and to engage the robot unit 50 with the carrier unit 20 for transportation, so that multiple users are not require to lift the robot unit 50 onto the police vehicle 12, and so that the police officer never has to leave the safety of the police cruiser to retrieve the robot unit 50.

Any arrangement of display(s) may be used, and may display images from the camera 56 and/or the docking camera 94, either simultaneously, alternately, or in turn responsive to a switch. For example, the primary display 90 may first show images from the docking camera 94 while the robot unit 50 is deployed, and then the user may switch to the camera 56 for driving the robot unit 50 to the suspect vehicle 16. Later, once the robot unit 50 has approached the carrier unit 20, the docking camera 94 may be used to guide the robot unit 50 into the carrier unit 20.

While particular wireless connection elements are shown and described herein, the terminology used herein is expressly defined to include alternative arrangements of transmitters, transceivers, and other data transmissions and communications elements to enable the user to control the robot unit 50 and to receive the images from the camera 56 and/or the docking camera 94.

While the particularly described embodiment includes the police officer in the police cruiser, the robot system may also be used in the military, where the above-described benefits may be of even greater importance. A single military operator may operate the robot unit 50 from within the safety of an armored vehicle, for example, and never have to leave the safety of the armored vehicle to operate the robot unit 50 and explore potentially dangerous situations (and potentially even engage in combat, if the robot unit 50 is outfitted with a weapon).

A docking control device 96 operably mounted within the police vehicle 12 enables the police officer to operably control the docking actuator 46, such as the above-described pulley system. The docking control device 96 may also enable the police officer to operably control a safety locking hook 98 that locks the floor element 28 in the raised position while the robotic system 10 is not being used (and while the police vehicle 12 is being driven).

In the embodiment of FIG. 7, the robotic system 10 may include a recharging system 100 for automatically recharging a power source 80 of the robot unit 50. The recharging system 100 may include contacts 102 located on the carrier unit 20 that are operably positioned to electrically engage a recharging contact 104 on the robot unit 50 when the robot unit 50 is positioned within the carrier unit 20. When engaged, the contacts enable a vehicle power source 101 on the police vehicle 12, such as the car battery and/or alternator (not shown), to be used to recharge the power source 80 of the robot unit 50. The vehicle power source 101 may also power other components of the robotic system 10, such as the docking control device 96. Either the vehicle power source 101 and/or other batteries or power sources may be used to power other elements of the robotic system 10, such as the primary display 90 90, the recording device 92, and other elements of the robotic system 10.

In the embodiment of FIG. 7, the robotic system 10 further includes a vehicle microphone/speaker 106 operably positioned within the police vehicle 12, and a robot microphone/speaker 108 operably positioned on the robot unit 50, such as near the camera 56, so that the robot microphone/speaker 108 is positioned for communicating with the driver of the suspect vehicle 16. The vehicle microphone/speaker 106 and the robot microphone/speaker 108 are operably and wirelessly connected, either through the control unit 82 and robot transceiver 84, or though an independent wireless connection, or any other similar or equivalent connection. The vehicle microphone/speaker 106 and the robot microphone/speaker 108 enable the police officer to talk to the driver of the suspect vehicle 16, instructing him or her to place his or her identification card in the identification holder 74, and to hear the questions, comments, or answers of the driver. If necessary, the police officer could also instruct the driver and/or any passengers to step out of the suspect vehicle 16, so that the police officer can try to get the suspect away from any potential weapons without having to approach the suspect vehicle 16.

The terminology used in the specification provided above is hereby defined to include similar and/or equivalent terms, and/or alternative embodiments that would be considered obvious to one skilled in the art given the teachings of the present patent application. Additionally, the words "a," "an," and "one" are defined to include one or more of the referenced item unless specifically stated otherwise. Also, the terms "have," "include," "contain," and similar terms are defined to mean "comprising" unless specifically stated otherwise.

While the invention has been described with reference to at least one embodiment, it is to be clearly understood by those skilled in the art that the invention is not limited thereto. Rather, the scope of the invention is to be interpreted only in conjunction with the appended claims.

What is claimed is:

1. A robotic system adapted to deploy from a police vehicle onto a street for inspecting an interior of a suspect vehicle, the robotic system comprising:
   a robot unit comprising:
      a robot base having a pair of track elements driven by a motor element responsive to a control unit having a robot transceiver;
      a camera for capturing images of the suspect vehicle;
      an extendable arm operably attached to the robot base to support the camera;
      an arm actuator for controlling the extendable arm, for raising the camera from a lowered position adjacent the robot base, to a raised position in which the camera is raised above the robot base to a height for inspecting the interior of the suspect vehicle;
      a control unit for operably controlling the pair of track elements, the arm actuator, and the camera; and
   a remote control unit adapted to be operably positioned within the police vehicle, the remote control unit being adapted for operably controlling the control unit of the robot unit;
   a carrier unit comprising:
      a mounting base that is adapted to be mounted on the police vehicle;
      a carrier housing having a floor element with a generally planar top surface, side edges, and a forward edge, the floor element being sized and shaped to receive the robot unit thereupon;
      a pair of pivots that pivotally mount the carrier housing onto the mounting base such that the carrier housing can pivot between a raised position wherein the top surface is generally vertical, and a lowered position wherein the top surface is generally horizontal and wherein the forward edge is adjacent the street so that the robot unit can be driven onto the top surface; and
      a locking element for locking the robot unit onto the top surface;
   a docking camera operably positioned adjacent the carrier unit for capturing images of the robot unit as it approaches and operatively engages the carrier housing; and
   a primary display adapted to be operably positioned within the police vehicle for displaying the images of the suspect vehicle from the camera of the robot unit, and/or the images of the robot unit from the docking camera.

2. A robotic system for inspecting a suspect vehicle, the robotic system comprising:
   a police vehicle;
   a robot unit comprising:
      a robot base having a drive system responsive to a control unit having a robot transceiver; and
      a camera operably mounted on robot unit for inspecting the suspect vehicle;
   a primary display for displaying the images from the camera, the primary display being operably positioned within the police vehicle so that the primary display may be viewed without exiting the police vehicle;
   a remote control unit operably positioned within the police vehicle for operably controlling the control unit of the robot unit, so that the remote control unit may be utilized without exiting the police vehicle;
   a carrier unit operably mounted on the police vehicle for transporting the robot unit, the carrier unit comprising:
      a mounting base mounted on the police vehicle;
      a carrier housing having a floor element sized and shaped to receive the robot unit thereupon, the floor element having a top surface and a forward edge;
      a pair of pivots that pivotally mount the carrier housing onto the mounting base such that the carrier housing can pivot between a raised position wherein the top surface is generally vertical, and a lowered position wherein the top surface is generally horizontal and wherein the forward edge is adjacent the street so that the robot unit can be driven onto the top surface;
      a docking actuator for lifting the floor element from the lowered position to the raised position; and a locking element for locking the robot unit onto the top surface; and a docking control device operably positioned within the police vehicle for operably controlling the docking actuator, for raising and lowering the floor element without exiting the police vehicle.

3. A robotic system for inspecting a suspect vehicle, the robotic system comprising:

a police vehicle;

a robot unit comprising:

a robot base having a drive system responsive to a control unit having a robot transceiver;

an extendable arm that is movable between a stored position and an extended position responsive to the control unit, the extendable arm including a lower lever lift driven by an actuator, and an upper scissor jack driven by a screw drive, the control unit functioning to first raise the upper scissor jack until an assist lever has raised the lower lever lift at least partially towards the extended position, at which point both the lower lever lift and the upper scissor jack can move fully to the extended position; and     a camera operably mounted on the extendable arm for inspecting the suspect vehicle when the extendable arm is in the extended position;

a primary display for displaying the images from the camera, the primary display being operably positioned within the police vehicle so that the primary display may be viewed without exiting the police vehicle;

a remote control unit operably positioned within the police vehicle for operably controlling the control unit of the robot unit, so that the remote control unit may be utilized without exiting the police vehicle;

a carrier unit operably mounted on the police vehicle for transporting the robot unit, the carrier unit comprising:

a mounting base mounted on the police vehicle;

a carrier housing having a floor element sized and shaped to receive the robot unit thereupon, the floor element having a top surface and a forward edge;

a pair of pivots that pivotally mount the carrier housing onto the mounting base such that the carrier housing can pivot between a raised position wherein the top surface is generally vertical, and a lowered position wherein the top surface is generally horizontal and wherein the forward edge is adjacent the street so that the robot unit can be driven onto the top surface;

a docking actuator for lifting the floor element from the lowered position to the raised position; and     a locking element for locking the robot unit onto the top surface; and a docking control device operably positioned within the police vehicle for operably controlling the docking actuator, for raising and lowering the floor element without exiting the police vehicle.

\* \* \* \* \*